United States Patent [19]

Cartwright

[11] 4,260,711

[45] Apr. 7, 1981

[54] 1-OLEFIN POLYMERIZATION CATALYST

[75] Inventor: Richard V. Cartwright, Sussex, N.J.

[73] Assignee: Hercules Incorporated, Wilmington, Del.

[21] Appl. No.: 142,498

[22] Filed: Apr. 21, 1980

[51] Int. Cl.³ .......................... C08F 4/66; C08F 10/06
[52] U.S. Cl. .............................. 526/153; 252/429 C; 526/139; 526/163; 526/351
[58] Field of Search .................... 526/139, 153, 163

[56] References Cited

U.S. PATENT DOCUMENTS

| | | | |
|---|---|---|---|
| 3,128,296 | 4/1964 | Johnson | 526/163 |
| 3,502,634 | 3/1970 | Stedefeder et al. | 526/139 |
| 4,094,818 | 6/1978 | Lanzer | 526/153 |

Primary Examiner—Edward J. Smith
Attorney, Agent, or Firm—John W. Whitson

[57] ABSTRACT

In the polymerization of 1-olefins using a solid catalyst component composed of a titanium trichloride and an activator component composed of a trialkylaluminum, the stereospecificity of the catalyst is increased by replacing a portion of the trialkylaluminum in the activator component with a dialkylaluminum dialkylphosphate.

4 Claims, No Drawings

1-OLEFIN POLYMERIZATION CATALYST

This invention relates to the polymerization of 1-olefins using an improved catalyst. More particularly, it relates to an improved trialkylaluminum activator composition and the process of using it. This composition provides for increased stereospecifically of the catalyst when used as a catalyst component in the polymerization of 1-olefins.

As is well known in the art, effective catalysts for the polymerization of 1-olefins are the Ziegler-Natta catalysts obtained by combining transition metal compounds of Groups IVb to VIb of the periodic table with organometallic compounds of Groups I to III of the table. One of the best combinations, especially for producing highly stereoregular polymers, is titanium trichloride and diethylaluminum chloride. After polymerization is completed, the polymer is commonly washed with a reagent, such as an alcohol, which will dissolve these catalyst components.

In spite of careful and thorough washing, however, some catalyst residue invariably remains. This residue contains one or more inorganic chlorides, which can cause corrosion of metal parts with which the polymer comes in contact. The potential for corrosion can be reduced by using an organoaluminum compound which does not contain any halide. Triethylaluminum is one such compound which is especially promising for this purpose, since $TiCl_3$-$Et_3Al$ catalysts are highly active. The stereospecificity of $TiCl_3$-$Et_3Al$ catalysts is inferior to that of $TiCl_3$-$Et_2AlCl$ catalysts, however, as a high proportion of amorphous polymer being formed when polymerizing a monomer such as propylene.

Now, in accordance with this invention, it has been found that, in a process of polymerizing 1-olefins using a solid catalyst component composed of titanium trichloride and an activator component composed of a trialkyaluminum, the stereospecificity of the catalyst in the production of a stereoregular polymer product can be considerably improved by replacing a portion of the trialkylaluminum with a dialkylaluminum dialkylphosphate. For example, the replacement, on a molar basis, of approximately one-half of the trialkylaluminum with a dialkylaluminum dialkylphosphate in the activator composition has provided catalysts which readily decrease the amount of diluent-soluble polymer by 10 to 25% and, at the same time, ordinarily increase the rate of polymerization by as much as 25 to 30%.

Having generally described the embodiments of this invention, the following examples constitute specific illustrations thereof. All amounts are as given in the examples and all operations were carried out in an inert atmosphere.

EXAMPLES 1 to 4

Titanium Trichloride Preparation

A glass reaction flask was charged with a solution formed by dissolving 504 millimoles of titanium tetrachloride in hexane to a total volume of 185 ml. To this solution was slowly added, over a period of four hours, a solution formed by dissolving 511 millimoles of diethyaluminum chloride in hexane to a total volume of 435 ml. During addition of the diethylaluminum chloride, and for 20 minutes thereafter, the reaction mixture was stirred at 300 r.p.m. and maintained at a temperature between 0° and −3° C. The reaction mixture was then heated to 25° C. over a one-hour period, maintained at 25° C. for one hour, heated to 60° C., over a one-hour period and maintained at 60° C. for two hours.

An amount of the above reaction mixture sufficient to provide 122 millimoles of titanium trichloride was diluted with hexane to a total volume of 505 ml. The resulting slurry was transferred to an 800-ml. pressure bottle, and there was then added to the slurry 24 ml. of a 0.5 M solution of diethylaluminum chloride in hexane and 35 ml. of a 4.13 M solution of ethylaluminum dichloride in heptane. The contents of the bottle were shaken, the solids were allowed to settle and the supernatant liquid was removed down to a total volume of 200 ml. The bottle was then placed in a 60° C. oil bath and the contents were agitated by means of a magnetic stirring bar. Another 800-ml. pressure bottle was filled with propylene at a pressure of 40 p.s.i.g. and propylene was transferred from this bottle to the first bottle until the pressure in the second bottle was 14 p.s.i.g. Stirring was continued for another 15 minutes. Then the solids were washed with hexane until the supernatant liquid contained less than 0.2 g./l. of soluble chloride.

After suspending the above solids in hexane, the resulting slurry was transferred into a jacketed glass reactor equipped with a paddle agitator. Supernatant liquid was removed down to a slurry volume of 98 ml., after which 18.5 ml. of diisoamyl ether was added while stirring the slurry at 170 r.p.m. and circulating 35° C. water through the reactor jacket. The resulting mixture was stirred for one hour, after which the solids were allowed to settle. The supernatant liquid was then decanted down to a residual slurry volume of 61 ml., after which hexane was added to bring the slurry volume up to 73 ml. With stirring at 170 r.p.m. and 70° C. water circulating through the jacket, 25 ml. of $TiCl_4$ was added. The resulting mixture was stirred for two hours, after which the solid product was washed with hexane until the supernatant liquid contained no more than 0.1 g./l. of soluble chloride. The titanium trichloride solids were then suspended in hexane for use in the polymerization reaction.

Diethylaluminum Diethylphosphate Preparation

A glass reaction vessel was charged with 38.6 millimoles of triethylaluminum, followed by sufficient hexane to provide 100 ml. of solution. The solution was stirred at room temperature while adding 5.1 ml. (38.6 millimoles) of dry diethylphosphate. A small amount of a flocculent white precipitate was formed. The reaction mixture was then heated at 75° C. for two hours, after which the solution of the diethylaluminum diethylphosphate reaction product was separated from the precipitate by centrifuging and decantation. Analysis showed that essentially all of the original amount of aluminum was present in the solution.

Polymerization of Propylene

Polymerizations were conducted in magnetically stirred vessels of 800 millimeters volume. Each vessel was charged with 400 ml. of purified hexane, which was free of air and water, under argon. The vessel was then charged, at room temperature, with the following catalyst components, in the order given: triethylaluminum; diethylaluminum diethylphosphate and titanium trichloride. The concentration of each component in the reaction mixture is given in Table I in terms of millimoles per liter. The argon was replaced by propylene. After approximately five minutes, the temperature of the vessel was raised to 60° C., and the propylene pressure was increased to 37 p.s.i.g. Propylene was continuously added to the reaction mixture for the time shown in Table I, after which the addition of propylene was discontinued and the system was reacted down for 15 minutes. The remaining excess propylene was then vented off, and both the dissolved and insoluble polymer were recovered and dried. The amount of polymer soluble in the hexane diluent is reported in Table I as the percent diluent solubles (% DS), and the polymerization rate is reported in terms of Zieglers (the number of grams of diluent-insoluble polypropylene product produced per millimole of titanium per atmosphere of propylene per hour).

TABLE I

| Ex. No. | [Et$_3$Al] (mmols/l.) | [Et$_2$AlOP(O)(OEt)$_2$] (mmols/l.) | [TiCl$_3$] (mmols/l.) | Time (hrs.) | Rate (Zieglers) | % DS |
|---|---|---|---|---|---|---|
| 1 | 2.0 | 4.0 | 1.0 | 3.0 | 46 | 5.8 |
| 2 | 4.0 | 4.0 | 1.0 | 3.0 | 32 | 6.3 |
| 3 | 4.0 | 0.0 | 1.3 | 2.0 | 28 | 11.2 |
| 4 | 0.0 | 4.0 | 1.0 | 3.0 | 0.8 | 21.2 |

EXAMPLES 5 to 10

Further polymerizations were carried out following generally the procedure of Examples 1 to 4 except to use a titanium trichloride catalyst component prepared by a scaled-up version of the preparation shown in the earlier examples. The results obtained are shown in Table II.

TABLE II

| Ex. No. | [Et$_3$Al] (mmols/l.) | [Et$_2$AlOP(O)(OEt)$_2$] (mmols/l.) | [TiCl$_3$] (mmols/l.) | Time (hrs.) | Rate (Zieglers) | % DS |
|---|---|---|---|---|---|---|
| 5 | 1.0 | 4.0 | 0.9 | 3.7 | 44 | 9.4 |
| 6 | 2.0 | 4.0 | 1.1 | 4.0 | 32 | 6.9 |
| 7 | 2.0 | 2.0 | 1.0 | 4.0 | 35 | 7.5 |
| 8 | 2.7 | 1.3 | 1.0 | 4.0 | 34 | 8.5 |
| 9 | 2.0 | 0.0 | 1.0 | 3.8 | 34 | 10.9 |
| 10 | 4.0 | 0.0 | 0.8 | 4.0 | 26 | 10.1 |

EXAMPLES 11 to 15

Additional polymerizations were made following generally the procedure of Examples 1 to 4 except to use dimethylaluminum diethylphosphate as the dialkylaluminum dialkylphosphate component of the activator composition. The data for these examples are given in Table III.

TABLE III

| Ex. No. | [Et$_3$Al] (mmols/l.) | [Me$_2$AlOP(O)(OEt)$_2$] (mmols/l.) | [TiCl$_3$] (mmols/l.) | Time (hrs.) | Rate (Zieglers) | % DS |
|---|---|---|---|---|---|---|
| 11 | 2.0 | 4.0 | 1.7 | 2.0 | 32 | 5.6 |
| 12 | 2.0 | 2.0 | 1.3 | 2.0 | 36 | 10.5 |
| 13 | 4.0 | 4.0 | 1.1 | 2.0 | 27 | 8.8 |
| 14 | 4.0 | 0.0 | 1.3 | 2.0 | 28 | 11.2 |
| 15 | 0.0 | 4.0 | 1.0 | 2.0 | 0.9 | 29.3 |

The improved activator component of the Ziegler-Natta catalyst system used in the polymerization of 1-olefins in accordance with this invention is composed of a trialkylaluminum and a dialkylaluminum dialkylphosphate. Each of these is a necessary ingredient, and the amounts thereof relative to each other are important in obtaining the desired polypropylene products.

In general, the trialkylaluminums (R$_3$Al) used in accordance with this invention are those trialkylaluminums in which each alkyl group contains from one to ten carbon atoms. Representative compounds are trimethylaluminum, triethylaluminum, tri-n-propylaluminum, triisopropylaluminum, tri-n-butylaluminum, triisobutylaluminum, tri-n-hexylaluminum, triisohexylaluminum, tri-n-decylaluminum and mixtures thereof.

The dialkylaluminum dialkylphosphates (R$_2$AlOP(O)(OR')$_2$) used in the activator component in accordance with this invention are the dialkylphosphate derivatives of the corresponding trialkylaluminums. Exemplary of these dialkylphosphate derivatives are diethylaluminum diethylphosphate and dimethylaluminum diethylphosphate. These compounds are prepared under an inert atmosphere by reaction in a hydrocarbon solvent of any of the aforementioned trialkylaluminums with a dialkylphosphate having the general formula

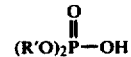

wherein R' is a C$_2$-C$_8$, preferably a C$_2$-C$_4$, alkyl group, which groups may be straight-or branched-chain and the same or different. The reaction involves replacement of one of the alkyl groups of the trialkylaluminum with a dialkylphosphate group. Representative of the dialkylphosphates of the above formula are diethylphosphate, diisopropylphosphate, dibutylphosphate and ethylpropylphosphate. The dialkylaluminum dialkylphosphates may be prepared apart from or in the polymerization reactor but, in either instance, are used in the form of their hydrocarbon solutions. Mixtures of these compounds may also be used in accordance with this invention, and it is not necessary that the alkyl groups of the dialkylphosphate correspond to the alkyl groups of the trialkylaluminum compound.

The mole ratio of the trialkylaluminum to the dialkylaluminum dialkylphosphate in the activator component used in accordance with this invention is important. More specifically, this ratio may be in the range of from about 1:4 to about 2:1, but it is preferably in the range of from about 1:2 to 1:1. Within the latter range, the best balance of high rates with a low diluent-solubles content is obtained. In general, at the same number of millimoles of total aluminum per millimole of titanium, the combined activator components in accordance with this invention always provide for less diluent solubles, thus greater stereospecificity, than either the trialkylaluminum or the dialkylaluminum dialkylphosphate alone.

The titanium trichloride to be used as the catalyst component in accordance with this invention may be prepared by any of the following methods: (a) reduction of titanium tetrachloride with an organoaluminum compound; (b) reduction of titanium tetrachloride with aluminum; or (c) reduction of titanium tetrachloride with hydrogen. It is preferred to use titanium trichloride prepared by method (a). In the reduction procedure of method (a), the organoaluminum compound may be either a compound having the general formula $R_{3-n}AlX_n$, wherein R is an alkyl group of 1 to 12 carbon atoms, preferably 1 to 6 carbon atoms, or an aryl group, preferably phenyl, X is a chlorine or bromine atom, and n is 0, 1 or 2; or it may be a blend of compounds providing a composition corresponding to the above formula, for instance, a blend of an organoaluminum compound and an aluminum halide; or it may be a composition of two or more kinds of organoaluminum compounds having a composition corresponding with the above formula.

Exemplary of the organoaluminum compounds used to reduce the titanium tetrachloride are the alkyl or aryl aluminum dihalides such as methylaluminum dichloride, ethylaluminum dichloride, propylaluminum dichloride, n-butylaluminum dichloride, isobutylaluminum dichloride, hexyaluminum dichloride, hexylaluminum dibromide, phenylaluminum dichloride and tolyaluminum dichloride; the alkyl or arylaluminum sesquihalides such as methylaluminum sesquichloride, ethylaluminum sesquichloride, n-butylaluminum sesquichloride and phenylaluminum sesquichloride; the dialkyl or diaryaluminum halides such as dimethylaluminum chloride, diethylaluminum chlorine, di-n-butylaluminum chloride, dihexylaluminum chloride, dihexylaluminum bromide, diphenylaluminum chloride and ditolylaluminum chloride; and the trialkyl or triarylaluminums such as triethylaluminum, tri-n-propylaluminum, triisopropylaluminum, tri-n-butylaluminum, triisobutylaluminum and tri-n-hexylaluminum. These compounds may be used singly or in the form of an admixture of two or more of the compounds. Use of diethylaluminum chloride is preferred.

The titanium trichloride composition obtained by the reduction of titanium tetrachloride with an organoaluminum compound will contain an aluminum-containing substance, which is presumed to be aluminum chloride or $RAlX_2$ or $R_2AlX$, where R and X are as defined above. These aluminum-containing compounds will usually be present in the reduced titanium trichloride composition in an amount of from about 0.01 to about 1.0 mole of aluminum per mole of titanium, and this amount generally will be found when the molar ratio of organo-aluminum compound to titanium tetrachloride is from about 0.1 to about 3.0. Excess amounts of the aluminum-containing compounds may be removed from the titanium chloride composition by treatment with an aliphatic ether containing four to twenty-four carbon atoms, such as diisoamyl ether, and the ether may subsequently be removed by treatment with titanium tetrachloride.

The reduction of the titanium tetrachloride with an organoaluminum compound may be conducted in the absence of a diluent, but generally is carried out in the presence of a $C_5$–$C_{12}$ aliphatic or cycloaliphatic hydrocarbon or a $C_6$–$C_{12}$ monocyclic aromatic hydrocarbon. Representative of these hydrocarbons are pentane, hexane, heptane, octane, cyclopentane, benzene, toluene and xylene. These hydrocarbons also may be used to wash the titanium trichloride composition both prior and subsequent to the ether and titanium tetrachloride treatments mentioned above.

The 1-olefins which may be polymerized in accordance with this invention are well known. In addition to the propylene shown in the examples, other representative olefins are ethylene, 1-butene, 4-methyl-pentene-1 and 1-hexene. Mixtures of the 1-olefins also may be utilized. The polymerization of these olefins is improved in accordance with this invention in that the stereospecificity of the catalyst and, usually, the rate of polymerization are better than when the activator component is composed only of a trialkylaluminum. Accordingly, the polymerization of 1-olefins in accordance with this invention represents a distinct improvement in the art.

What I claim and desire to protect by Letters Patent is:

1. In a process for the polymerization of 1-olefins in the presence of a solid catalyst component composed of titanium trichloride and an activator component composed of a trialkylaluminum, the improvement which comprises substituting a dialkylaluminum dialkylphosphate for a portion of the trialkylaluminum in the activator, such substitution being made so as to provide a mole ratio of trialkylaluminum to dialkylaluminum dialkylphosphate of from about 1:4 to about 2:1.

2. The process of claim 1 wherein the mole ratio of trialkylaluminum to dialkylaluminum dialkylphosphate is from about 1:2 to about 1:1.

3. The process of claim 2 wherein the trialkylaluminum is triethylaluminum and the dialkylaluminum dialkylphosphate is diethylaluminum diethylphosphate.

4. The process of claim 2 wherein the trialkylaluminum is triethylaluminum and the dialkylaluminum dialkylphosphate is dimethylaluminum diethylphosphate.

* * * * *